July 3, 1962 R. N. NUNN 3,041,850
WATER LINE FREEZING DEVICE
Filed April 29, 1960

ROBERT N. NUNN
INVENTOR.

BY *Loyal J. Miller*
ATTORNEY

United States Patent Office 3,041,850
Patented July 3, 1962

3,041,850
WATER LINE FREEZING DEVICE
Robert N. Nunn, Oklahoma City, Okla.
(614 E. Arbor, Midwest City, Okla.)
Filed Apr. 29, 1960, Ser. No. 25,683
3 Claims. (Cl. 62—293)

The present invention relates to plumbing and more particularly to a water line freezing device.

It is frequently necessary to change the water line stop and waste valve in a dwelling, or the like, and to accomplish this the source of supply of water to the dwelling must be interrupted or turned off. Some times this necessitates locating and uncovering a control valve remote from the dwelling and its closing interrupts the water service to a number of dwellings or establishments other than the one being serviced. Locating this control valve and uncovering it is a time consuming operation and inconveniences a number of individuals by the interruption of water services.

It is common practice to freeze the water in a section of the house supply line to form a stop or dam and thus eliminate the necessity of locating the master control valve. The usual practice of freezing water lines for repairing the same opposite the source of supply comprises packing the periphery of a short length of the pipe with "Dry Ice," for example, solidified carbon dioxide presently sold under the trade name "Dry Ice," which by vaporizing absorbs the heat in the pipe and liquid contained therein, thus freezing the liquid and forming a dam. While this process is satisfactory from an operational point of view, it is an expensive and time consuming operation in that the line must be exposed and a trip is usually necessary to a supply house to obtain the "Dry Ice." In order to effect a quick freezing action more of the ice is usually purchased than is consumed in the freezing operation and the excess is usually discarded when removed from the pipe line for lack of proper means for its storage. Thus not only the excess ice is wasted but the time of at least one employee and the vehicle used for transportation adds to the cost of freezing the line.

It is, therefore, the principal object of the instant invention to provide a device by which liquid flow through a water line to a dwelling may be interrupted by freezing the liquid within a short length of the pipe thereby forming a stop or dam.

Another object is to provide an apparatus for temporarily freezing the liquid within the pipe which may be quickly assembled around the pipe and freeze the liquid therein in a relatively short time.

Another object is to provide a liquid line freezing device which employs a gaseous refrigerant for removing the heat from the liquid contained by the line.

A further object is to provide a liquid line freezing device which is relatively simple in operation and inexpensive to operate.

A further object is to provide an apparatus and method of forming a dam in a fluid containing line which will effect a considerable saving in the time and expense required for the freezing operation.

The present invention accomplishes these and other objects by providing an expansion chamber formed of two parts defining a central cylindrical bore extending through the chamber adapted to receive a length of liquid conveying pipe. The interior of the chamber is filled with loosely packed fibrous material. A volatile liquid and a gaseous refrigerant are introduced into the expansion chamber for removing heat from and freezing the fluid.

Other objects will be apparent from the following description when taken in conjunction with the accompanying single sheet of drawings, wherein.

Like characters of reference designate like parts in those figures of the drawings in which they occur.

In the drawings.

Figure 2:
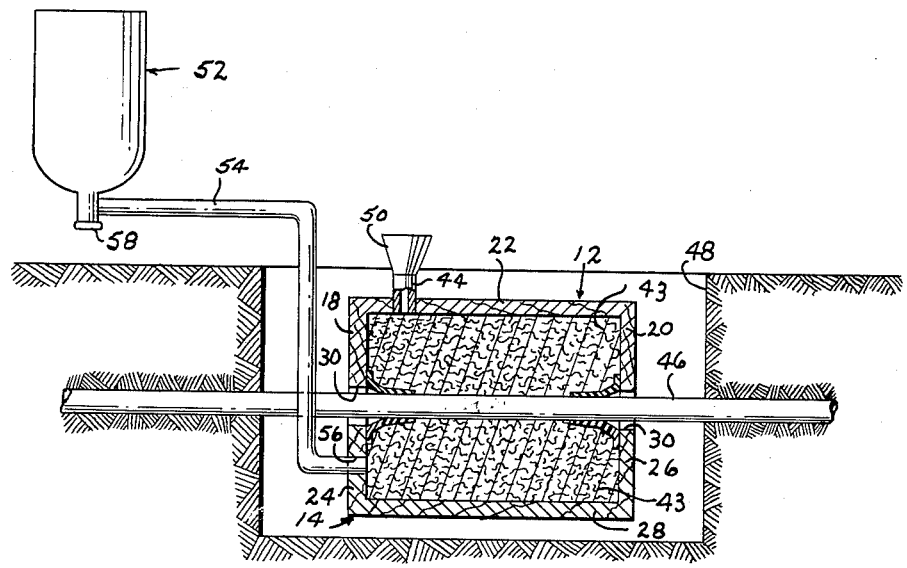
FIGURE 2 is a vertical cross-sectional view, partly in elevation, of the device in operative position.
Figure 1:
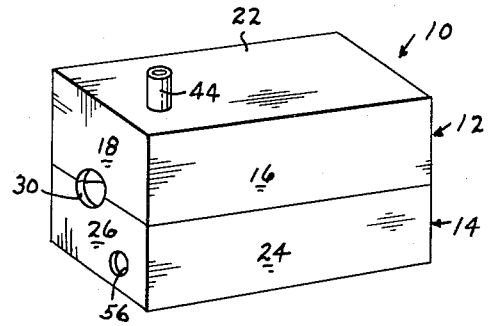
FIGURE 1 is a perspective view of the expansion chamber, per se.
Figure 3:
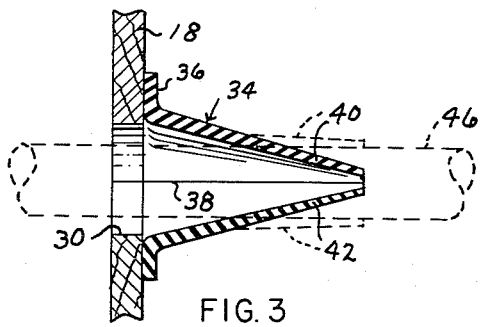
FIGURE 3 is a fragmentary cross-sectional view of one line engaging end portion of the expansion chamber.

The reference numeral 10 indicates an expansion chamber, as a whole, which is rectangular in general configuration and is divided horizontally to form two parts or sections 12 and 14. The upper section 12 comprises opposing side walls 16, only one of which is shown in the drawings, and end walls 18 and 20 which are joined by a horizontal top or panel 22. The lower section 14 is substantially identical with respect to the upper section 12 comprising opposing side walls 24 and end walls 26 and 28. With the two sections 12 and 14 assembled, as shown, the end walls of the chamber are each centrally drilled at the juncture of the two sections, as at 30, forming co-operating semi-circular recesses in opposing ends of each section which define aligned cylindrical bores or openings in the chamber. The size of the aperture 30 is preferably relatively large for cooperatingly enveloping pipes of different diameters.

A substantially conical shaped sealing member 34, of resilient material, is connected by its base end 36 to the inner surface of the respective end portions around the aperture 30 and the sealing member is longitudinally split or divided, as at 38, to form two halves or sections 40 and 42 permitting separation of the chamber sections 12 and 14 and for co-operatingly enveloping the periphery of a pipe.

A small tubular member 44 extends vertically through the panel 22 of the upper section for the purposes which will presently be apparent.

Operation

In operation a section of a water pipe 46 to be frozen is exposed by excavating the soil, as at 48. The two sections of the expansion chamber 10 are assembled on the pipe, as shown in FIG. 2, with the pipe 46 extended through the apertures 30. The interior of the chamber is preferably filled with loosely packed fibrous material, such as steel wool 43. A selected quantity, for example one pint of volatile liquid, preferably acetone, is poured into the expansion chamber through the tube 44 using a funnel 50, or the like.

A tank of compressed carbon dioxide gas, indicated generally by the numeral 52, and including a length of flexible hose or tube 54 is positioned adjacent the excavation 48. The free end of the hose 54 is inserted into the lower section 14 of the chamber through a suitable aperture 56. The valve 58 of the compressed gas container is opened momentarily to permit a charge of the carbon dioxide gas to enter and fill the interior of the chamber 10. Vaporization of the carbon dioxide gas and volatile liquid removes the heat from the enclosed section of pipe and liquid contained therein in a thermal conducting action, thus freezing the liquid and forming a plug or dam in the pipe 46. The time of this freezing action is relatively short requiring only approximately 3 minutes for water pipes up to and including ¾ inch diameters. After the liquid has frozen, the hose 54 and expansion chamber 10 are disengaged from the pipe and the valve or pipe repairing function is completed while the frozen section of the liquid begins to thaw. The thawing of the frozen dam requires from 12 to 15 minutes time which is normally ample time for making the desired changes in the plumbing connection. Obviously the expansion chamber may be left in place, if desired, to keep the liquid frozen for a greater length of time.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A water line freezing device for use in temporarily freezing the liquid within a short length of liquid containing pipe, comprising: a two-part expansion chamber each part having a semi-circular recess in opposing ends defining a circular opening in each end of said chamber for the reception of the length of pipe, each part of said chamber comprising spaced side and end walls and a panel member extending therebetween; a resilient member connected to the inner surface of the end walls of said chamber for enveloping the length of pipe; loosely packed fibrous material within said chamber and means for introducing a gaseous refrigerant into said chamber, said means including a tubular member connected, at one end, with one wall of one part of said chamber in communication with the interior of the latter, said tubular member adapted to be connected, at its other end, with a source a gaseous refrigerant under pressure.

2. A water line freezing device for use in temporarily freezing the liquid within a short length of liquid containing pipe, comprising: a divided hollow expansion chamber comprising upper and lower parts, each part having a semi-circular recess in its opposing ends defining a circular opening in each end of said chamber for cooperative reception of the length of pipe, each part of said chamber comprising spaced side and end walls and a panel member extending therebetween; a resilient member connected to the inner surface of the end walls of said chamber for forming a seal between the pipe and the end walls of said chamber; loosely packed fibrous material within said chamber; and means for introducing a gaseous refrigerant into said chamber, said means including a tubular member connected, at one end, with one end wall of one part of said chamber in communication with the interior of the latter, said tubular member adapted to be connected, at its other end, with a source of gaseous refrigerant under pressure.

3. A water line freezing device for use in temporarily freezing the liquid within a short length of liquid containing pipe, comprising: a hollow rectangular expansion chamber horizontally divided to form upper and lower parts, each part having a semi-circular recess formed in opposing ends defining a circular opening in each end of said chamber for the reception of the length of pipe, each part of said chamber having side walls and a panel member extending therebetween disposed in spaced relation with respect to the pipe; a conical shaped longitudinally divided resilient member connected to the inner surface of the respective end walls of each part of said chamber for forming a seal between the pipe and the end walls of said chamber; loosely packed steel wool filling the interior of said chamber; and means for introducing a quantity of gaseous carbon dioxide into said chamber, said means comprising a tubular member connected, at one end, to one end of the lower part of said chamber below the recess therein in communication with the interior of said chamber, said tubular member connected, at its other end, with a source of carbon dioxide under pressure.

References Cited in the file of this patent

UNITED STATES PATENTS

| | | |
|---|---|---|
| 2,320,506 | Bennett | June 1, 1943 |
| 2,483,082 | Young | Sept. 27, 1949 |
| 2,572,555 | Young | Oct. 23, 1951 |
| 2,766,597 | Gieck | Oct. 16, 1956 |